Figure 1:
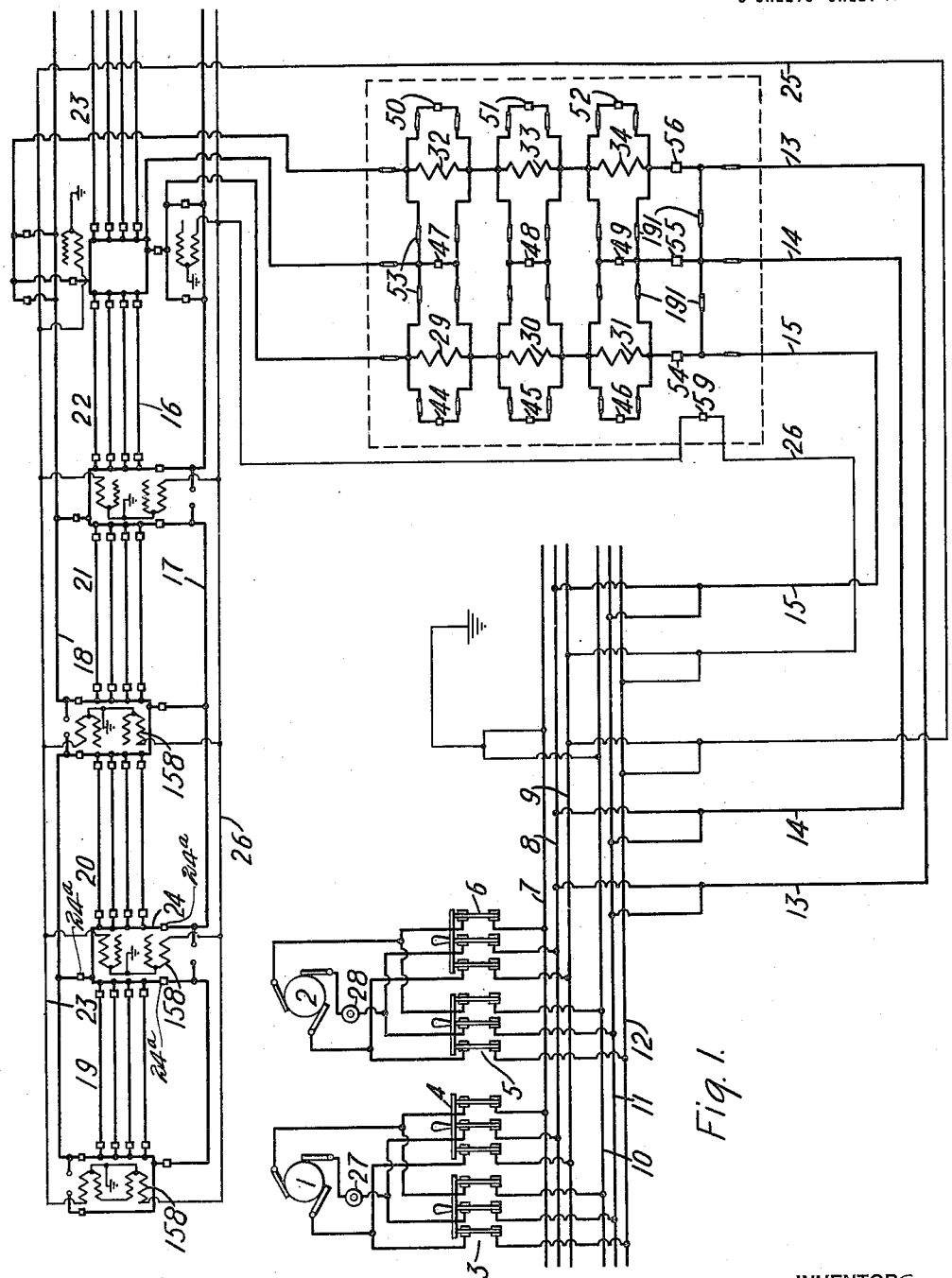

H. P. DAVIS & F. CONRAD.
SYSTEM OF ELECTRICAL DISTRIBUTION.
APPLICATION FILED OCT. 15, 1914.

1,159,904.

Patented Nov. 9, 1915.
3 SHEETS—SHEET 2.

WITNESSES:
Fred. A. Lind
Fred H. Miller

INVENTORS
Harry P. Davis
Frank Conrad
BY
ATTORNEY

H. P. DAVIS & F. CONRAD.
SYSTEM OF ELECTRICAL DISTRIBUTION.
APPLICATION FILED OCT. 15, 1914.
1,159,904.
Patented Nov. 9, 1915.
3 SHEETS—SHEET 3.
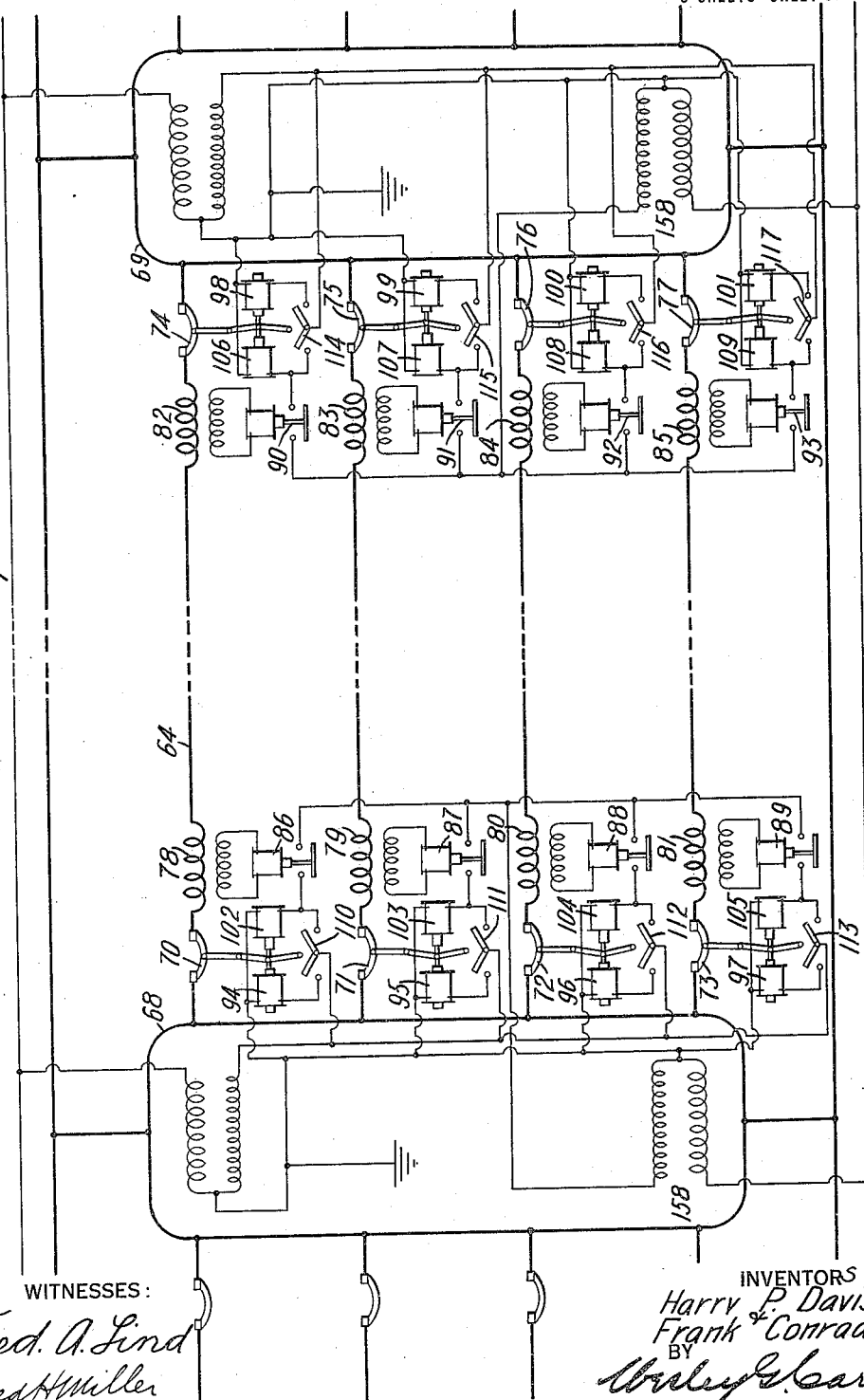
WITNESSES:
Fred. A. Lind
Fred H Miller
INVENTORS
Harry P. Davis
Frank Conrad
BY
ATTORNEY

UNITED STATES PATENT OFFICE.

HARRY P. DAVIS AND FRANK CONRAD, OF PITTSBURGH, PENNSYLVANIA, ASSIGNORS TO WESTINGHOUSE ELECTRIC & MANUFACTURING COMPANY, A CORPORATION OF PENNSYLVANIA.

SYSTEM OF ELECTRICAL DISTRIBUTION.

1,159,904.      Specification of Letters Patent.      Patented Nov. 9, 1915.

Original application filed December 31, 1908, Serial No. 470,232. Divided and this application filed October 15, 1914. Serial No. 866,834.

*To all whom it may concern:*

Be it known that we, HARRY P. DAVIS, a citizen of the United States, and a resident of Pittsburgh, in the county of Allegheny and State of Pennsylvania, and FRANK CONRAD, a citizen of the United States, and a resident of Swissvale Station, Pittsburgh, in the county of Allegheny and State of Pennsylvania, have invented a new and useful Improvement in Systems of Electrical Distribution, of which the following is a specification, this application being a division of application Serial No. 470,232, filed December 31, 1908.

Our invention relates to systems of electric current distribution, and it has special reference to such systems as are adapted to supply power to the feeder and trolley circuits of electric railways.

The object of our invention is to provide a system of the class above indicated that shall embody automatic means for cutting out one or more sections of the trolley circuits under predetermined conditions, such as the occurrence of grounds on said sections.

When two or four track railways are equipped electrically, the amount of power which is necessarily supplied to the distributing circuits of the system is very great, and it has been found desirable to divide the line conductors into sections comprising a plurality of trolley line conductors which are interconnected at the ends of the sections, feeder circuits being tapped into the various interconnected conductors or bus bars at the ends of the sections. For example, in a four track system, four supply conductors are connected in multiple to constitute a single section of the supply line from which the locomotives or other railway vehicles are supplied with energy, each of the conductors being provided with circuit interrupters at its respective ends by which it may be rendered electrically dead or cut out of the circuit. If the various circuit interrupters, located as above indicated, are provided with automatic overload release magnets which are dependent for their interruption directly upon the current traversing the circuit, it is found that the system cannot be rendered selective, because the amount of current supplied to the grounded section from adjacent sections is sufficiently great to cut out a large number of sections, including the grounded section, instead of cutting out the grounded section alone. Furthermore, it is found that a short circuit or ground on a single section tends to create voltage disturbances on the entire system, which are liable to destroy the insulation of the generator, or of the line conductors.

In the present system, the difficulties just referred to are entirely avoided by the following precautionary measures; viz., choke coils are permanently connected in the circuit close to the generators, and resistance is temporarily inserted in the main feeder circuits when a ground occurs anywhere on the line, and energy is supplied through an auxiliary circuit to a set of relay contacts, with which each one of the section circuit breakers is provided, said relay contacts being bridged by movable contact members when a current exceeding a predetermined value traverses the main circuit which is established through the section interrupters. When a ground occurs with the arrangement described, the shock which might otherwise injure the generator is partially absorbed by the choke coils. At the instant the ground occurs, the current traversing several of the adjacent section interrupters may be sufficiently great to raise the bridging contact members of the relay switches just referred to, but the arrangement of circuits is such that, when the resistance is automatically inserted in the main supply circuits of the system, all of the relay contacts will fall, due to the current reduction, except those associated with the interrupters located at the ends of the grounded section, and, when the current is finally supplied to the auxiliary circuit, as hereinafter explained in detail, only these last named interrupters will be actuated. As soon as the grounded section is cut out, the resistances which were inserted will be automatically shunted. The dead section may be again energized by closing the circuit interrupters located at its ends, which may be accomplished from a control station or other distant point by a master switch. It is obvious that the cutting out of a single section will not materially interfere with the traffic of a multitrack railroad.

The ohmic resistances which are inserted in the main circuit serve other useful purposes and various other novel features, which render our improved system specially adapted for railway service, will be hereinafter pointed out.

The system of control for the circuit breakers just briefly described and to be more fully explained hereinafter is claimed in application Serial No. 470,232, filed Dec. 31, 1908, of which this application is a division, and in the present case the claims are directed to a system of distribution for power in connection with which the said protective system is especially useful.

Figure 2:
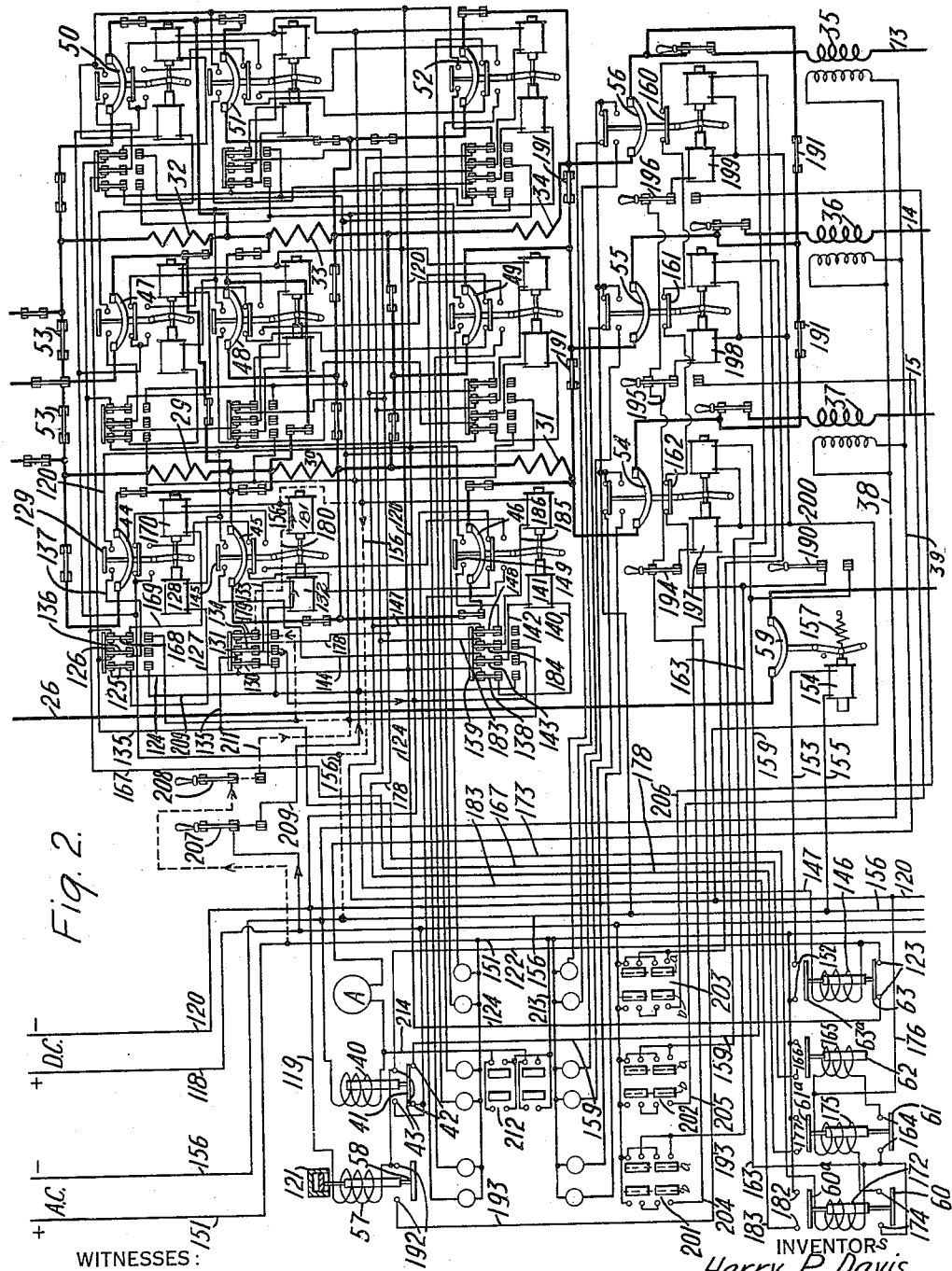

Our invention is illustrated in the accompanying drawings in which Figure 1 is a diagrammatic view of the main circuits, the circuit interrupters being indicated by small squares, Fig. 2 is a similar view showing the main and control circuit connections at the power station end, and Fig. 3 is a diagram showing the main and auxiliary circuit connections for a section of the line.

Referring to Fig. 1 of the drawings, alternating current energy is produced by a plurality of polyphase generators 1 and 2 and is transmitted through cut-out switches 3, 4, 5 and 6 to two sets of bus bars 7—8—9 and 10—11—12. From one phase of the bus bars, energy is transmitted through conductors 13, 14 and 15 to a plurality of trolley conductors 16 and feeder conductors 17 and 18.

The trolley conductors 16 constitute the supply circuits for a multitrack railway, one conductor being provided for each track (not shown), and the entire group of conductors being divided into a large number of sections 19, 20, 21, 22 and 23, each of which comprises a plurality of trolley conductors of equal length connected in multiple circuit and severally provided with circuit interrupters at their respective ends by which they may be cut out of circuit or rendered electrically dead. The ends of the sections are tied together by bus bars 24 which are arranged in the form of a loop and are connected to the feeder circuits 17 and 18 through suitable interrupters 24ª.

It will be observed in Fig. 1 that the feeder conductors 17 and 18 are looped at the points of division of the trolley conductors, the bus bars 24 constituting the said loops, and that the loops in the one feeder conductor alternate in position with those of the other. It will also be observed that each bus bar 24 is connected at each end by a circuit interrupter to the feeder conductor of which it constitutes a loop and that it is connected by only one circuit interrupter to the other feeder conductor.

As hereinafter explained, the circuit interrupters which are located at the ends of the trolley sections are capable of being automatically actuated, under predetermined conditions, and are also capable of remote control, energy being supplied to suitable actuating magnet windings through auxiliary feeder circuits 25 and 26 which are supplied with energy that may, or may not, be in phase with the main feeder and trolley circuits.

For purposes of illustration, three-phase generators are employed for supplying energy to the circuits indicated above, one phase being grounded, a second phase being connected to the main feeder and trolley circuits and a third phase being connected to the auxiliary feeder circuits.

Choke coils 27 and 28 are severally connected in series with the main power phases of the generators 1 and 2 for the purpose of partially absorbing the shocks which would otherwise act severely upon the generators when any of the feeder or line conductors become accidentally grounded or short circuited, and resistance sections 29 and 32, 30 and 33, and 31 and 34 are adapted to be automatically inserted in groups in the main circuits, when the current demand upon the generators exceeds a predetermined amount, for any cause. The control circuits for the circuit interrupters and resistance sections, which are located at or near the generating station, are illustrated in Fig. 2 to which reference may now be had, corresponding parts being designated by the same reference characters in each of the drawings.

The supply conductors 13, 14 and 15 are severally provided with series transformers 35, 36 and 37, the secondary windings of which are connected in multiple and serve to supply energy to a control circuit 38—39. This control circuit is utilized for supplying energy to the magnet winding 40 of an overload relay switch 41, the arrangement of parts being such that the relay switch bridges contact members 42, under normal conditions, but bridges contact members 43 when the current traversing the main circuit conductors 13, 14 and 15 exceeds a predetermined amount.

The resistances 29 to 34 are normally excluded from the circuit by means of shunt connections which are established through a plurality of circuit interrupters 44 to 52, inclusive, and switches 53 which are normally closed. The circuits 13, 14 and 15 are also provided with circuit interrupters 54, 55 and 56 which are intended to automatically interrupt the main feeder and trolley circuits under extreme conditions when a grounded or short circuited section is not excluded from the circuit by ordinary means employed for automatically accomplishing this result.

As soon as the overload relay switch 41 is raised, a circuit is established through magnet winding 57, of a definite time limit relay switch 58, which is finally closed if the overload continues on the main circuit conductors 13, 14 and 15 for more than a predetermined time.

When an overload occurs on the line, for any reason, the circuit interrupters 44, 45 and 46 are successively and automatically opened so that the resistances 29, 30 and 31 are successively included in the circuit. The circuit breakers 47 and 50 act concurrently with the breaker 44, the circuit breakers 48 and 51 with the breaker 45, and the circuit breakers 49 and 52 act concurrently with the breaker 46. Consequently, the resistances 29 and 32, 30 and 33, and 31 and 34 are simultaneously included in the circuits 15 and 13. As soon as the resistances are connected in circuit, a circuit breaker 59 is automatically closed so that energy is supplied to auxiliary feeder circuit 26.

The successive action of the circuit interrupters 44 to 52, inclusive, is effected by relay switches 60 and 60$^a$, 61 and 61$^a$, 62, and 63 and 63$^a$.

Reference may now be had to Fig. 3 in which a single section of the feeder and trolley circuits shown in Fig. 1 are illustrated. As here shown, trolley conductor sections 64, 65, 66 and 67 are connected in multiple circuit between bus bars 68 and 69 through circuit interrupters 70 to 73 and 74 to 77, inclusive. The trolley sections are provided with series transformers 78 to 81 and 82 to 85, inclusive, at their respective ends, from the secondary windings of which energy is directly applied to relay switches 86 to 93, inclusive. The circuit interrupters 70 to 77, inclusive, are provided with closing magnet coils 94 to 101, inclusive, release magnets 102 to 109, inclusive, and master switches 110 to 117, inclusive, by which the circuit breakers may be manually governed from a remote point. Under normal conditions, the circuit interrupters are all closed and the master switches occupy their open circuit positions. When these circuit conditions obtain, if an abnormal demand is made upon any section, either by reason of a ground or other disturbance, the relay switches, connected to the series transformers having an abnormal current flowing through their primary windings, are closed, and a circuit is established from the auxiliary feeder circuit 26 to the release magnet coils of the adjacent circuit interrupter. Consequently, the circuit interrupters affected will be opened as soon as the auxiliary feeder circuit 26 is energized.

The operation of and the circuit connections for the system are as follows: Assuming that the switching devices and circuit breakers occupy the positions shown in the drawings, the resistance sections 29 to 34, inclusive, being shunted, and the section circuit breakers 70 to 77, inclusive, and those corresponding to them, being closed, if the trolley section 65 is accidentally connected to ground, so that a short circuit occurs on the line, energy will immediately be supplied from the bus bars 68 and 69 through circuit interrupters 71 and 75 and series transformers 79 and 83 to ground. It is evident that energy will be supplied from the feeder circuits 17 and 18 to the bus bars and from the adjacent trolley sections through other circuit interrupters and series transformers to the grounded section. Consequently, the amount of current traversing the series transformers 79 and 83 will be very excessive and the current traversing other circuit interrupters and series transformers in the vicinity may also be considerably greater than the normal current supplied through them for the operation of locomotives or other electric vehicles. For this reason, if the circuit breakers for each section are properly set to protect the said section against overload and other adverse conditions, not only the grounded section but many other sections may obviously be excluded from the circuit if the circuit interrupters are directly responsive to abnormal currents which may or may not be of considerable duration.

In the system illustrated, the first effect of a ground or other cause of abnormal demand on any section of the line is to energize one or more of the series transformers 35, 36 and 37 which might supply current to the magnet winding 40 of the overload relay 41, circuit being established through conductors 38 and 39. When this relay is actuated, the contacts 43 are bridged and a control circuit is established from any suitable source of preferably direct current energy through conductor 118 (see Fig. 2), contact fingers 43, magnet windings 57 and conductor 119 to negative line conductor 120. The magnet winding 57, when energized, starts to close the relay switch 58 which is retarded by dash pot 121 or by other suitable means whereby a predetermined time element may be introduced in the action of the relay switch. Another circuit is completed from the contacts 43 through conductor 122, contact 123 of switch 63, conductor 124, blade 125 of switch 126, conductor 127 and release coil 128 of circuit breaker 44 to negative conductor 120. The circuit breaker 44 is opened and the auxiliary switch 129, which is operatively connected with the circuit breaker, is closed. A circuit is now completed from conductor 124 to blade 130 of switch 131 to release coil 132 of circuit breaker 45, circuit being completed from this point through conductor 133, blade 134 of switch 131, conductor 135 and blade 136 of switch 126, conductor 137 and switch 129 (which is now closed) to negative conductor 120. Circuit breaker 45 is thus opened and a third circuit is then completed from conductor 124, through blade 138 of switch 139, conductor 140, conductor 142, blade 143 of switch 139, conductor 144, control switch 145 (which is now closed) to negative conductor 120.

As above indicated, the circuit breakers 44, 47 and 50 operate concurrently and, since their control circuits are similar and are also connected in multiple, a detailed description of the circuit connections for the circuit breakers 44, 45 and 46 is considered sufficient for the understanding of all.

Thus it will be observed that the resistance sections 29 and 32 are first included in the main circuits and resistances 30 and 33, and 31 and 34 are successively inserted following the insertion of the resistances 29 and 32. As soon as the circuit breakers 46, 49 and 52 are opened, the relay switches 63 and 63ª (which are mechanically connected) are closed, a circuit being completed from conductor 122 through the magnet winding 146, conductor 147, blade 148 of switch 139 and control switch 149 to the negative conductor 120. The change in the positions of the relay switches 63 and 63ª interrupts the circuits which were completed through the release magnet coils of the circuit interrupters 44 to 52, inclusive, and completes a control circuit from any suitable source of alternating current through a conductor 151, contacts 152 of the switch 63ª, conductor 153, closing coil 154 of circuit breaker 59, and conductor 155 to negative conductor 156. The circuit interrupter 59 is normally opened, the closing coil 154 acting in opposition to a spring 157. When closed, the circuit interrupter 59 completes a circuit from bus bars 9 and 12 (see Fig. 1) through auxiliary feeder 26 to the primary coils of a plurality of series transformers 158, the secondary windings of which are adapted to energize the contacts that are bridged by the relay switches 86 to 93, inclusive, and the corresponding relay switches of each section and the trolley line.

Although a great many of the relay switches may have been closed when a ground or short circuit occurred on the trolley section 65, the resistance sections 29 to 34, inclusive, are so proportioned as to reduce the current sufficiently to open all of the relay switches except the switches 87 and 91, which are energized from the secondary windings of transformers 79 and 83, the primary windings of said transformers being obviously supplied with current of larger value than any of the others, by reason of the fact that the ground or short circuit occurred between them. From the foregoing relations, it is evident that, when the circuit breaker 59 is closed and energy is supplied finally to the auxiliary feeder 26, only two circuits are established from the secondary windings of the transformers 158, which are adjacent to the section, through relay switches 87 and 91, respectively, to release magnet coils 103 and 107, circuits being completed from these coils to ground which forms the return circuit to the grounded bus bars 7 and 10. The energizing of the release coils 103 and 107 effect the opening of the circuit interrupters 71 and 75 so that the trolley section 65 is cut out.

The time required for the mechanism to act automatically and cut out the grounded section is very short and therefore when the circuit breakers are controlled by hand (switches 207 and 208 being closed as hereinafter explained) overload on the conductors 35, 36 and 37 should be removed promptly by inserting the resistance and supplying current to the auxiliary feeder 26, thereby restoring normal conditions in the circuit and permitting the relay switch 41 to drop before the time limit relay 58 is closed.

Assuming that the grounded section 65 has been successfully excluded from the circuit and that the relay switch 41 has dropped, a circuit is completed from the conductor 118 through contact fingers 42, conductor 159, control switches 160, 161 and 162, which are operatively connected to the circuit breakers 56, 55 and 54, respectively, conductor 163, magnet coil 172 of switches 60 and 60ª (which are mechanically connected), conductor 173, conductor 135, switch blade 136, conductor 137, control switch 129 of the circuit breaker 44 to the negative conductor 120. When the switches 60 and 60ª are closed, a direct current circuit is completed from conductor 163 through contacts 174, magnet winding 175 of switches 61 and 61ª (which are joined mechanically) and conductor 176 to the negative conductor 120. The magnet coil 175, when energized, closes switches 61 and 61ª and another direct current circuit is then established from conductor 163 through contacts 164, coil 165 and conductor 176 to the negative conductor 120. Thus, it will be observed that the relay switches 60 and 60ª, 61 and 61ª and 62 are successively closed as soon as the overload relay switch 41 drops. When the coil 172 is energized, switches 60 and 60ª are closed and an alternating current circuit is established from conductor 151 through contact members 182, conductor 183, switch blade 184, conductor 185, coil 186 to negative conductor 156. When the coil 186 is energized, as above indicated, the circuit breaker 46 is closed. As the switches 61 and 61ª are closed, an alternating current circuit is established from conductor 151 through contacts 177, conductor 178, switch blade 179, conductor 180 and closing coil 181 of circuit breaker 45 to negative conductor 156, and when switch 62 is closed, an alternating current circuit is established from conductor 151 through contacts 166, conductor 167, switch blade 168 and closing coil 170 of circuit breaker 44 to negative conductor 156. As indicated above, the circuit breakers 44, 45 and 46 were successively opened to introduce resistance sections into the main circuits of the system and from the circuits just traced it will be observed that, as soon as the abnormal demand upon the line has ceased, the resistance will be shunted by the successive closing of the circuit breakers 46, 45 and 44 in the order named.

It will be observed that the direct current circuit which actuates the first relay switches of the series 60 and 60ª, 61 and 61ª, 62, and 63 and 63ª is dependent upon the condition of the main line circuit breakers 54, 55 and 56, or, in other words, it is impossible to close the switches 54, 55 and 56 to throw current on the resistance circuits when the resistances 29 to 34, inclusive, are not connected in series with the main circuits. In this way, the resistances serve a double purpose, since they prevent a dangerous surge of current when the main circuit breakers are first closed and also serve to reduce the total current supplied to the system whenever a ground occurs or some other abnormal demand upon the system is made. A manually operated switch 190 is adapted to shunt the switches 160, 161 and 162 in order that the main circuit breakers 54, 55 and 56 may be manually controlled for the purpose of inspection and repairs, the circuit interrupters being shunted by suitable switches 191 (see Fig. 1) in order to prevent the interruption of the circuits at such times. If, for any reason, the grounded section is not cut out, as indicated above, before the time limit relay 58 is closed, a circuit will be established from positive line conductor 118 through contacts 43 of overload relay 41, contacts 192, conductor 193 and switches 194, 195 and 196 to release magnet coils 197, 198 and 199 of circuit breakers 54, 55 and 56, a circuit being completed from each of the coils through a conductor 200 to negative conductor 120. In this way, the entire circuit is interrupted if, after the resistance has been inserted, the current delivered to the system exceeds a predetermined amount for a definite time which is sufficient to permit the time relay 58 to close. When it is desired to close the circuit breakers 54, 55 and 56, a plurality of manually-operated control switches 201, 202 and 203 which are adapted to occupy two positions $a$ and $b$ are employed, a circuit being completed when the control switches occupy position $a$ from positive conductor 118 through the control switches and through conductors 204, 205 and 206 to switches 194, 195 and 196.

Switches 194, 195 and 196 normally occupy the position shown in Fig. 2 of the drawings, in which the release of the circuit breakers 54, 55 and 56 is automatically dependent upon the overload relay switch 41. If it is desired to control the release of any one, or all, of the circuit interrupters, manually, one, or more, of the above-named switches may be closed in the opposite direction from that shown, so that the circuits which were traced from the controllers 201, 202 and 203 to the switches 194, 195 and 196 may be completed through the release magnets and the negative conductors 200 and 120. It is desirable to provide the double pole single throw switch for each of the circuit interrupters in addition to the controllers in order to render the release of the circuit interrupters selective since the automatic release of the several interrupters is concurrent, the release magnet being connected in multiple circuit under these conditions.

The circuit breakers 44 to 52, inclusive, are provided with double throw switches which may be divided into three similar groups, corresponding to the three groups of circuit interrupters, the switches 126, 131 and 139 being illustrative of all of the sets. As already described, circuits are completed for automatically governing the circuit interrupters when the switches occupy the positions shown in Fig. 2 of the drawings, but if the position of the switches is changed, one or more of the circuit interrupters may be manually governed by control switches 207 and 208. For example, assuming that the position of the switch 131 is changed and that the control switch 207 is closed, a circuit is completed from conductor 118 through conductor 209, switch blade 130, of switch 131, release magnet coil 132, conductor 133, switch blade 134, conductor 135 to negative conductor 120. The circuit breaker may be again closed by closing the switch 208, when an alternating current circuit is established from conductor 151 through conductor 211, switch blade 179, conductor 180, closing coil 181 to negative conductor 156. Similar circuits are established through the release or closing coil of as many of the circuit breakers as are selected by the proper adjustment of the corresponding switches.

A controller 212 is provided for the purpose of testing out the automatic action of the system under overload conditions, a circuit being established, when this controller occupies an operative position, from conductor 151 through conductor 213, controller 212, conductor 214 and overload release magnet coil 40 to negative conductor 156. In this way, the overload release coil 40 is energized and the control circuits are established exactly as if the relay had been actuated by an overload on the line.

While the circuit arrangement illustrated has resulted from the practical application of the involved principles to commercial service, it will, of course, be understood that various modifications may be effected within the spirit and scope of our invention.

We claim as our invention:

1. A system of distribution comprising a distributing conductor that is divided into sections, a circuit breaker at each end of each section of said conductor, and a feeder conductor parallel to the aforesaid conductor having loops respectively connected to the aforesaid conductor at alternate points of division thereof.

2. A system of distribution comprising a plurality of parallel trolley conductors each of which is divided into sections, a circuit breaker at each end of each section of each trolley conductor, and two feeder conductors extending parallel to the trolley conductors having loops connected to the trolley conductors at their division points, and also to the other feeder conductor, the loops of the one conductor alternating in the said connections with those of the other.

3. A system of distribution comprising a plurality of parallel trolley conductors each of which is divided into sections, a circuit breaker at each end of each section of each trolley conductor, two feeder conductors extending parallel to the trolley conductors having loops connected to the trolley conductors at their division points, and also to the other feeder conductors, the loops of the one conductor alternating in the said connections with those of the other, a circuit breaker in each leg of each loop, and a circuit breaker in each connection from each loop to the other feeder conductor.

In testimony whereof, we have hereunto subscribed our names this 14th day of Oct., 1914.

HARRY P. DAVIS.
FRANK CONRAD.

Witnesses:
F. A. JORDAN,
B. B. HINES.

Copies of this patent may be obtained for five cents each, by addressing the "Commissioner of Patents, Washington, D. C."